Feb. 19, 1957   G. BAKOS   2,782,352
ALTERNATING-CURRENT MOTOR
Filed May 29, 1953

INVENTOR.
GYORGY BAKOS
BY
AGENT

United States Patent Office 2,782,352
Patented Feb. 19, 1957

2,782,352
ALTERNATING-CURRENT MOTOR

György Bakos, Eindhoven, Netherlands, assignor to Hartford National Bank and Trust Company, Hartford, Conn., as trustee Application May 29, 1953, Serial No. 358,243

3 Claims. (Cl. 318—173)

This invention relates to alternating-current motors in which the number of stator poles can be varied by switching over so that the motor can rotate at least at two different speeds and in which the rotor is of the short-circuit type for asynchronous starting. Motors of this kind are known, but they have the known disadvantage of asynchronous motors, that is that the slip varies upon varying load.

According to the invention the said disadvantage is obviated in that a part of the rotor in the axial direction comprises a number of distinct poles which is equal to one number of stator poles, and another part of the rotor in the axial direction comprises another number of distinct poles which is equal to the other number of stator poles after switching-over the stator in such manner that the motor can rotate at different speeds as a synchronous motor.

Such different synchronous speeds are important more particularly for magnetophone installations in which different speeds of the band, more particularly a pre-determined speed and double this speed are desirable in connection with composition of the carrier and quality of record and reproduction.

According to a further feature of the invention, the length in the axial direction of the larger number of distinct poles of the rotor is, at the most, equal to 0.6 and preferably about ⅓ of the length of the smaller number of distinct poles of the rotor. It has been found from experiments that a highly advantageous couple at different speeds thus ensues.

In one embodiment of the motor according to the invention, the smaller number of distinct poles of the rotor is bounded by grooves extending throughout the length of the rotor, the larger number of distinct poles being bounded, on the one hand, by short grooves located between the long grooves and, on the other hand, by part of the long grooves.

In order that the invention may be readily carried into effect, it will now be described with reference to one embodiment shown, by way of example, in the accompanying drawing.

Figure 1:
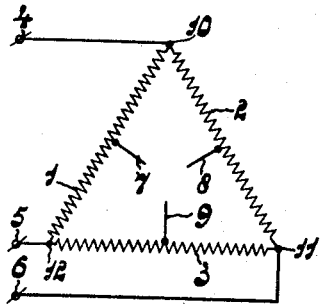
Fig. 1 shows diagrammatically a 3-phase winding for a 4-polar stator constructed in accordance with the present invention.
Figure 2:
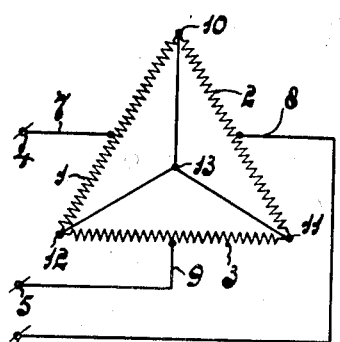
Fig. 2 shows diagrammatically a 3-phase winding for an 8-polar stator constructed in accordance with the present invention.
Figures 3, 4:
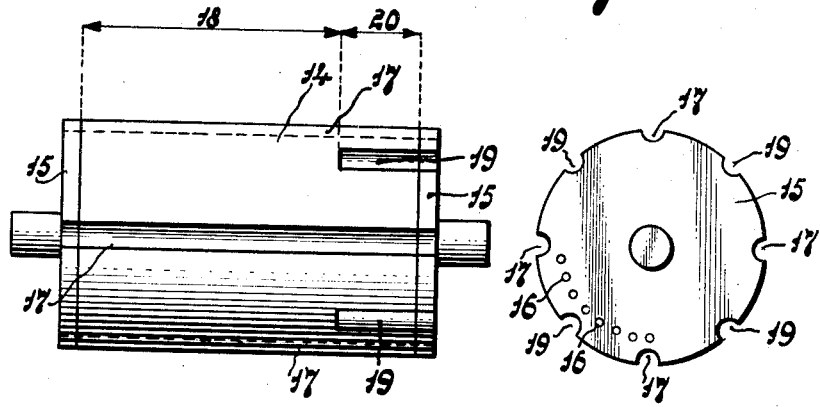
Fig. 3 is a plan view of the rotor embodying the present invention.
Fig. 4 is a front elevation view thereof.

In Fig. 1, the 3-phase windings 1, 2 and 3 of the stator of the motor according to the invention are shown diagrammatically. The windings 1 to 3, arranged in the form of a triangle, are connected to the mains 4, 5, 6, the centre taps 7, 8 and 9 not being connected. The stator is wound, for example, with 4 poles, the two halves of each phase winding 1, 2, 3 respectively being connected in series. If the stator is switched over by means of a switch which is not shown for the sake of simplicity, the centre taps, 7, 8 and 9 are connected to the mains 4, 5, 6, whereas the prior junctions to the mains 10, 11, 12 are interconnected at point 13 as seen in Fig. 2. The two halves of each phase winding 1, 2, 3 respectively are now connected in parallel and in this known manner an 8-polar stator instead of a 4-polar stator is obtained since the two halves of each phase winding are now traversed by current in opposite directions. In order to obtain the right matching of the rotor to either the 4-polar or the 8-polar stator, use is made of a rotor of the type as shown diagrammatically in Fig. 3 and Fig. 4.

An ordinary short-circuit rotor 14, of which the terminal plates and the rods are indicated by 15 and 16 respectively, is provided throughout its length with four grooves 17, so that four distinct poles of a synchronous rotor are formed on the part 18. This part co-operates with the 4-polar stator shown in Fig. 1, so that a synchronous speed of 1500 rev./min. ensues.

Grooves 19 located between the grooves 17 are provided on the part 20 through about ¼ of the total length of the rotor, so that on the part 20, which corresponds to about ⅓ of the part 18, eight distinct poles are provided, which ensure a synchronous speed as an 8-polar synchronous motor in combination with the 8-polar stator shown in Fig. 2. The speed is in this case 750 rev./min.

The short-circuit rotor in this case being about the asynchronous starting until the desired synchronous speed is reached.

It has been found that a highly satisfactory couple is developed at synchronous speed which would not be the case if use was made of a rotor comprising only one group of distinct poles.

Figure 5:
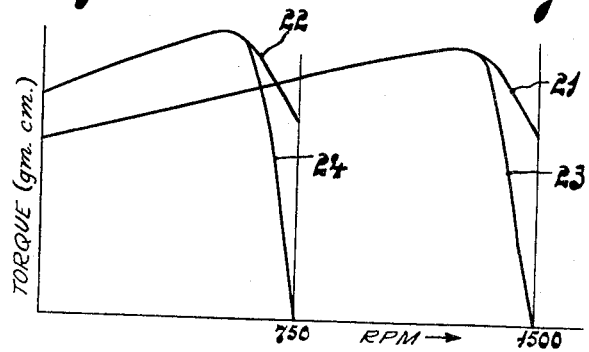
Fig. 5 shows the curves representing the speed-couple of the motor embodying the present invention.

The speed-couple curves of the above-mentioned embodiment for 1500 and 750 rev./min. are shown in Fig. 5 and indicated by 21 and 22 respectively. The curves 23 and 24 show the couples of the asynchronous part of the rotor.

Figure 6:
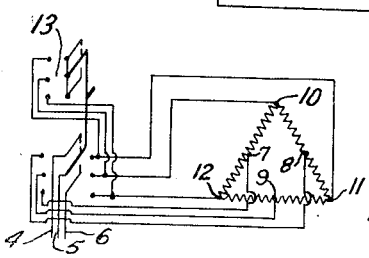
Fig. 6 is a schematic illustrating the switching arrangement of either a 4 pole stator or an 8 pole stator.

Fig. 6 illustrates line connections 7, 8 and 9 in open condition as in Fig. 1. However, if the contacts connected to the points 10, 11 and 12 are moved upwards so as to engage the contact 13 they are short-circuited. If the line connection 7, 8 and 9 are moved upwards to engage 4, 5 and 6, the connections of Fig. 2 are obtained.

It is evident that, according to the requirements to be imposed, instead of 4 and 8 poles other numbers of poles may be chosen, for example 2 and 4 poles.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. An alternating current motor capable of operating at least at two different speeds comprising a rotor of the short-circuit type for asynchronous starting, said rotor having one part thereof including a group of distinct poles equal to one group of stator poles and extending in the axial direction of said rotor, another part of said rotor having another group of distinct poles equal to another group of stator poles and extending in the axial direction of said rotor, said other group of rotor poles having a smaller number of distinct poles than said first group of rotor poles, said larger group being approximately ⅓ the axial length of said small group, and means for switching from one group of stator poles to another group of stator poles thereby causing said motor to rotate at different speeds as a synchronous motor.

2. A motor as set forth in claim 1 wherein said rotor is provided with a first plurality of longitudinal grooves extending through the entire length of said rotor and having one group of distinct poles therein and a second plurality of grooves being of shorter length than said first plurality of grooves, each of said second plurality of longitudinal grooves being located between two of said first plurality of longitudinal grooves, and the other group of distinct poles being positioned in both said first and second plurality of longitudinal grooves.

3. A motor as set forth in claim 1 wherein said one group of distinct poles has half the number of poles in said other group of distinct poles.

References Cited in the file of this patent
UNITED STATES PATENTS

| | | |
|---|---|---|
| 1,491,451 | Wieseman | Apr. 22, 1924 |
| 1,522,742 | Parvin | Jan. 13, 1925 |
| 1,946,289 | Lilienthal et al. | Feb. 6, 1934 |
| 2,483,848 | Saretsky | Oct. 4, 1949 |

FOREIGN PATENTS

| | | |
|---|---|---|
| 454,139 | Great Britain | Sept. 24, 1936 |